US009703723B2

(12) United States Patent
Mitsugi et al.

(10) Patent No.: US 9,703,723 B2
(45) Date of Patent: *Jul. 11, 2017

(54) METHOD AND APPARATUS FOR PERFORMING MAPPING WITHIN A DATA PROCESSING SYSTEM HAVING VIRTUAL MACHINES

(75) Inventors: Masanori Mitsugi, Yamato (JP); Hiroyuki Tanaka, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 534 days.

This patent is subject to a terminal disclaimer.

(21) Appl. No.: 13/543,950

(22) Filed: Jul. 9, 2012

(65) Prior Publication Data

US 2013/0054934 A1     Feb. 28, 2013

(30) Foreign Application Priority Data

Aug. 29, 2011   (JP) ................................. 2011-186487

(51) Int. Cl.
*G06F 12/08*     (2016.01)
*G06F 12/109*     (2016.01)
(Continued)

(52) U.S. Cl.
CPC ........ *G06F 12/109* (2013.01); *G06F 12/1018* (2013.01); *G06F 12/1408* (2013.01); *G06F 2212/151* (2013.01)

(58) Field of Classification Search
CPC ... G06F 21/1408; G06F 12/72; H04L 63/0428
(Continued)

(56) References Cited

U.S. PATENT DOCUMENTS 4,347,565 A * 8/1982 Kaneda et al. .............. 711/6
2002/0161848 A1 10/2002 Willman et al.
(Continued)

FOREIGN PATENT DOCUMENTS

| JP | 2005018610 A | 1/2005 |
| JP | 4123621 B2 | 7/2008 |
| JP | 2011081654 A | 4/2011 |

OTHER PUBLICATIONS

International Business Machines Corporation; PCT/JP2012/069112; International Search Report and Written Opinion (7 pp.); dated Jul. 27, 2012.
(Continued)

*Primary Examiner* — Brian Peugh
*Assistant Examiner* — Kenneth Tsang
(74) *Attorney, Agent, or Firm* — Brian F. Russell; Steven L. Bennett

(57) ABSTRACT

In an environment in which a processor operates a hypervisor and multiple guest partitions operating under the hypervisor's control, it is desirable to allow a guest partition access to a physical memory device without decreasing system performance. Accordingly, a conversion instruction for converting a logical address to a real address, i.e., an LTOR instruction, executable from a guest partition, is added to the processor. Upon the guest partition's execution of the conversion instruction with the logical address specified, the processor converts the logical address to an encrypted real address, and returns it to the guest partition. The guest partition is then able to pass the encrypted real address to an accelerator that converts the encrypted real address to a real address in order to access the memory device using the real address.

5 Claims, 8 Drawing Sheets

(51) Int. Cl.
*G06F 12/14* (2006.01)
*G06F 12/1018* (2016.01)

(58) Field of Classification Search
USPC .......................................................... 711/203
See application file for complete search history.

(56) References Cited

U.S. PATENT DOCUMENTS

| | | | |
|---|---|---|---|
| 2002/0184217 A1* | 12/2002 | Bisbee et al. ...................... | 707/9 |
| 2003/0154390 A1* | 8/2003 | Yamauchi et al. ............. | 713/193 |
| 2007/0294496 A1* | 12/2007 | Goss ................... | G06F 12/1408 |
| | | | 711/163 |
| 2010/0125708 A1 | 5/2010 | Hall et al. | |
| 2010/0153749 A1* | 6/2010 | Sakai .................. | G06F 21/6236 |
| | | | 713/193 |
| 2010/0281257 A1* | 11/2010 | Yamazaki et al. ............ | 713/168 |
| 2013/0031364 A1* | 1/2013 | Glew et al. ................... | 713/162 |
| 2013/0061047 A1 | 3/2013 | Sridharan et al. | |

OTHER PUBLICATIONS

Masanori Mitsugi et al., U.S. Appl. No. 13/780,335, filed Feb. 28, 2013, Non-Final Office Action dated Oct. 3, 2014.
Masanori Mitsugi et al., U.S. Appl. No. 13/780,335, filed Feb. 28, 2013, Notice of Allowance dated Apr. 8, 2015.

* cited by examiner

METHOD AND APPARATUS FOR PERFORMING MAPPING WITHIN A DATA PROCESSING SYSTEM HAVING VIRTUAL MACHINES

PRIORITY CLAIM

The present application claims benefit of priority under 35 U.S.C. §§120, 365 to the previously filed Japanese Patent Application No. JP2011-186487 with a priority date of Aug. 29, 2011, which is incorporated by reference herein.

BACKGROUND OF THE INVENTION

1. Technical Field

The present invention relates to hypervisor-controlled virtual machines in general, and in particular to a method and apparatus for performing mapping within a data processing system having multiple virtual machines.

2. Description of Related Art

In recent years, with the development of virtualization technology, it has become possible to use a hypervisor to logically divide a data processing system (i.e., a single physical machine) into multiple virtual machines. Each of the virtual machines has its own partition, and the hypervisor enforces separation among different virtual machines such that one virtual machine is not able to access a memory space of another virtual machine. An operating system and/or application program within a virtual machine can be referred to as a guest partition. Each guest partition addresses its memory space via a logical address. When a guest partition needs to access its memory space, the hypervisor must convert the logical address of the memory space to a physical address of a memory device by way of a conversion table. As such, several guest partitions within a data processing system may be able to access the same logical address without interfering with each other.

In order to increase processing speed of certain tasks, some processors within a data processing system can offload those tasks to a hardware accelerator within the data processing system. For example, processors such as Power7® and PowerEN® are capable of calling a hardware accelerator via an ICSWX instruction. If a virtual machine executes the ICSWX instruction, the logical partition identifier (LPARID) of the virtual machine and the addresses at which parameters on the memory are arranged to be sent to the hardware accelerator. Afterwards, data are generally exchanged between a guest partition of the virtual machine and the hardware accelerator via a memory (or a cache). Moreover, when data are complicated, it is necessary to use a data structure, such as a linked list, a tree or the like, to arrange pointers to various areas of the memory to locate the data. In this case, the guest partition prepares the data structure and corresponding pointers for pointing at various logical addresses. Since the hardware accelerator requires a physical address in order to access the physical memory device, it is necessary to inform the hardware accelerator of the relationship between physical addresses and logical addresses. The process of informing the hardware accelerator of the relationship between physical addresses and logical addresses is referred to as mapping.

A hypervisor typically performs any required mapping. However, every time the hypervisor performs mapping, a context switch between the hypervisor and a guest partition must occur, which decreases system performance drastically. Consequently, it would be desirable to provide an improved method for a guest partition to convert a logical address to a physical address without decreasing system performance.

SUMMARY OF THE INVENTION

In accordance with a preferred embodiment of the present disclosure, in response to a receipt of a logical address by a central processing unit of a data processing system, wherein the logical address is sent from a virtual machine within the data processing system, the central processing unit generates corresponding encrypted real address information. The central processing unit then sends the encrypted real address information back to the virtual machine, and in turn, the virtual machine sends the encrypted real address information to an accelerator. After the receipt of the encrypted real address information from the virtual machine, the accelerator decrypts the real address encrypted information into a real address information. The accelerator can now access a memory device within the data processing system by using a real address included within the real address information.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
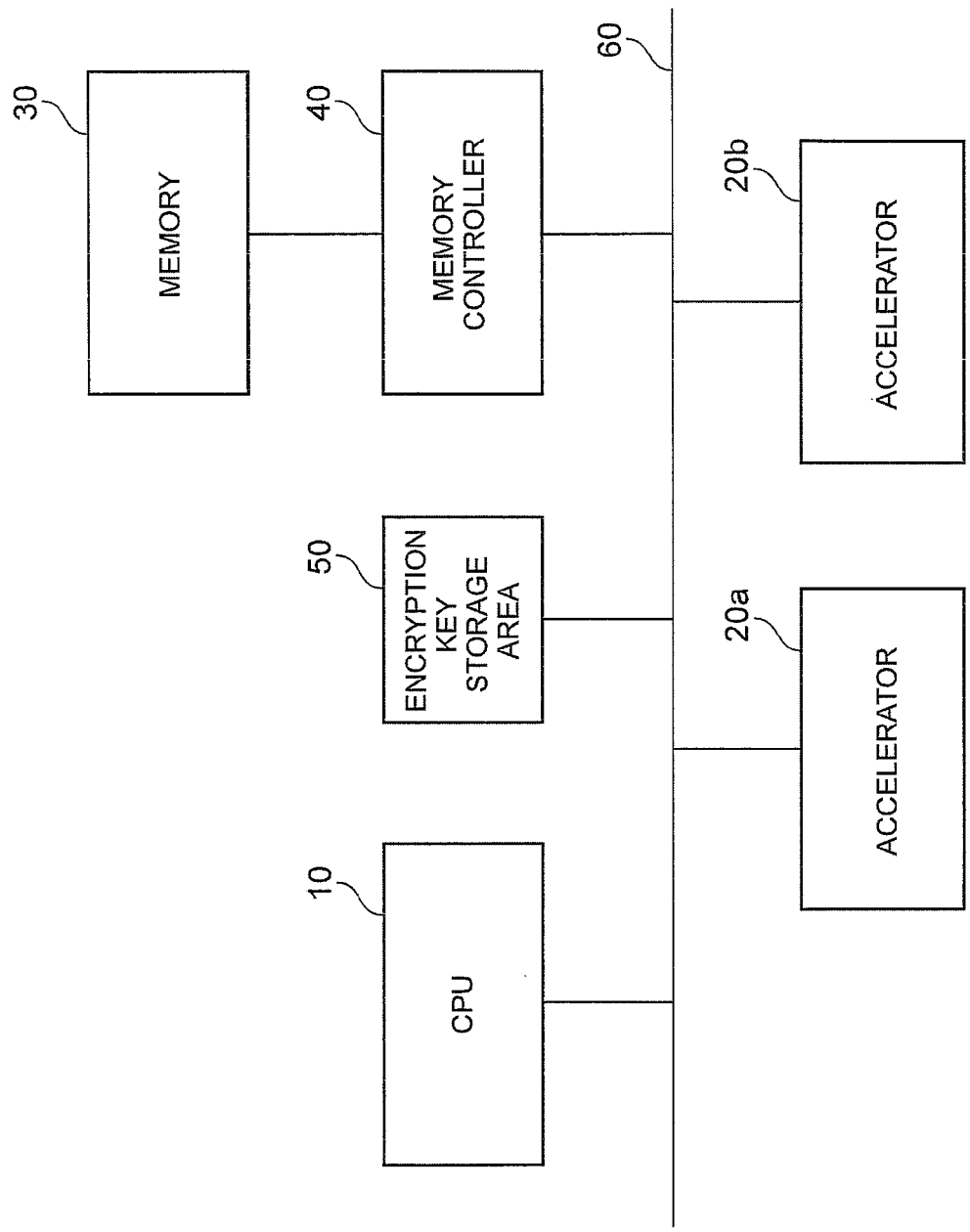
FIG. 1 is a block diagram of a data processing system in which a preferred embodiment of the present invention can be incorporated.

Referring now to the drawings and in particular to FIG. 1, there is depicted a block diagram of a data processing system in which a preferred embodiment of the present invention can be incorporated. As shown, a data processing system includes a central processing unit (CPU) 10, accelerators 20a, 20b, a memory device 30, a memory controller 40, and an encryption key storage area 50, all connected through a bus 60. Although accelerators 20a and 20b are shown in FIG. 1, they are also referred to as accelerator 20 when there is no need to distinguish between them.

CPU 10 controls the operation of the entire data processing system (i.e., one physical machine). A piece of software, called a hypervisor, runs on CPU 10 to implement one or more virtual machines within the data processing system, so that separate copies of the operating system (OS) and applications may operate within each virtual machine.

Memory device 30 stores data for CPU 10, including data which CPU 10 will pass to accelerator 20. Memory controller 40 controls writing and reading data to and from memory device 30.

Encryption key storage area 50 stores an encryption key used in encryption processing by CPU 10 and in decryption processing by accelerator 20. Only CPU 10 and accelerator 20 may access encryption key storage area 50. Encryption key storage area 50 is achievable by, for example, a trusted platform module (TPM).

Accelerator 20 increases system throughput by performing specific processing tasks for CPU 10. Such tasks may include data encryption, compression and/or decompression. Accelerator 20 requires a physical address in order to access memory device 30, and mapping is the process of informing accelerator 20 the relationship between logical addresses and physical addresses.

If a hypervisor were to convert a logical address received from a guest partition to a physical address of memory device 30 in the data processing system, a context switch between the hypervisor and the guest partition would be required. The context switch can drastically reduce the speed and performance of the data processing system.

In accordance with a preferred embodiment of the present invention, a guest partition does the necessary conversion for the hypervisor by providing CPU 10 with a conversion instruction, such as a LTOR instruction, that can be invoked by the guest partition. During the conversion process, the guest partition must not generate an invalid real address that may violate a memory space assigned to another guest partition. Thus, instead of generating a real address, an encrypted real address is passed to the guest partition in order to protect the memory space assigned to other guest partitions. For the present disclosure, the term "real address" should have the same meaning as the term "physical address."

Figure 2:
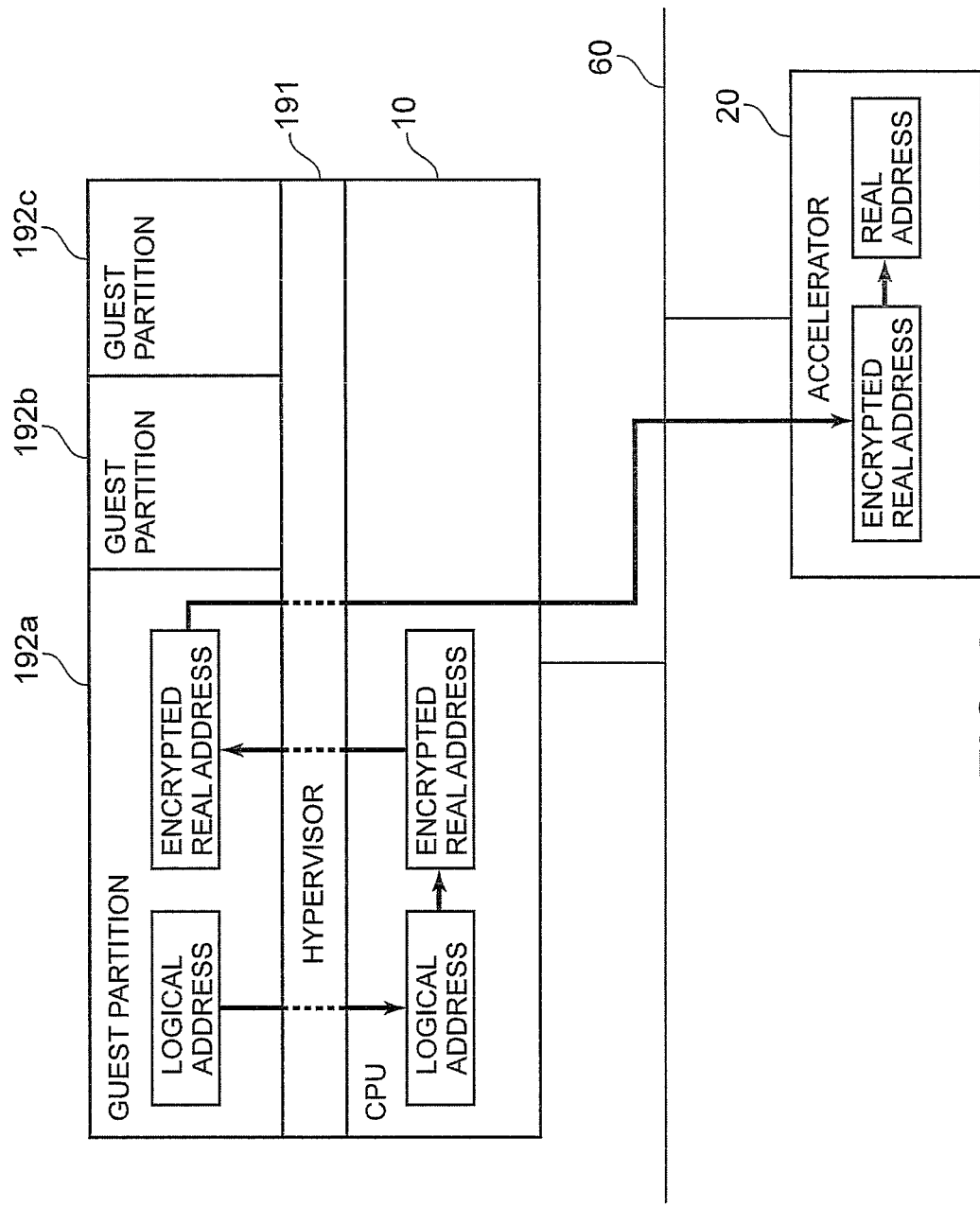
FIG. 2 is a diagram illustrating the outline of an operation performed when a guest partition converts a logical address to an encrypted real address and passes the encrypted real address to an accelerator.

FIG. 2 illustrates a guest partition's usage of the LTOR instruction to convert a logical address to an encrypted real address and pass the encrypted real address to accelerator 20. CPU 10 operates a hypervisor 191 that controls guest partitions 192a, 192b and 192c. Although three guest partitions 192a, 192b and 192c are shown, they may be referred to as guest partition 192 if there is no need to distinguish one from another.

Suppose guest partition 192a executes the LTOR instruction. Guest partition 192a sends a logical address to CPU 10. CPU 10 returns an encrypted real address as described above. Guest partition 192a then passes the encrypted real address to accelerator 20 through bus 60 without knowing the real address. Accelerator 20, having received the encrypted real address, decrypts the encrypted real address to a real address, and then accesses memory device 30 (from FIG. 1) using the real address. The encryption key used for the encryption by CPU 10 and for the decryption by accelerator 20 is stored in the encryption key storage area 50 (from FIG. 1) that is accessible only by CPU 10 and accelerator 20.

Figure 3:
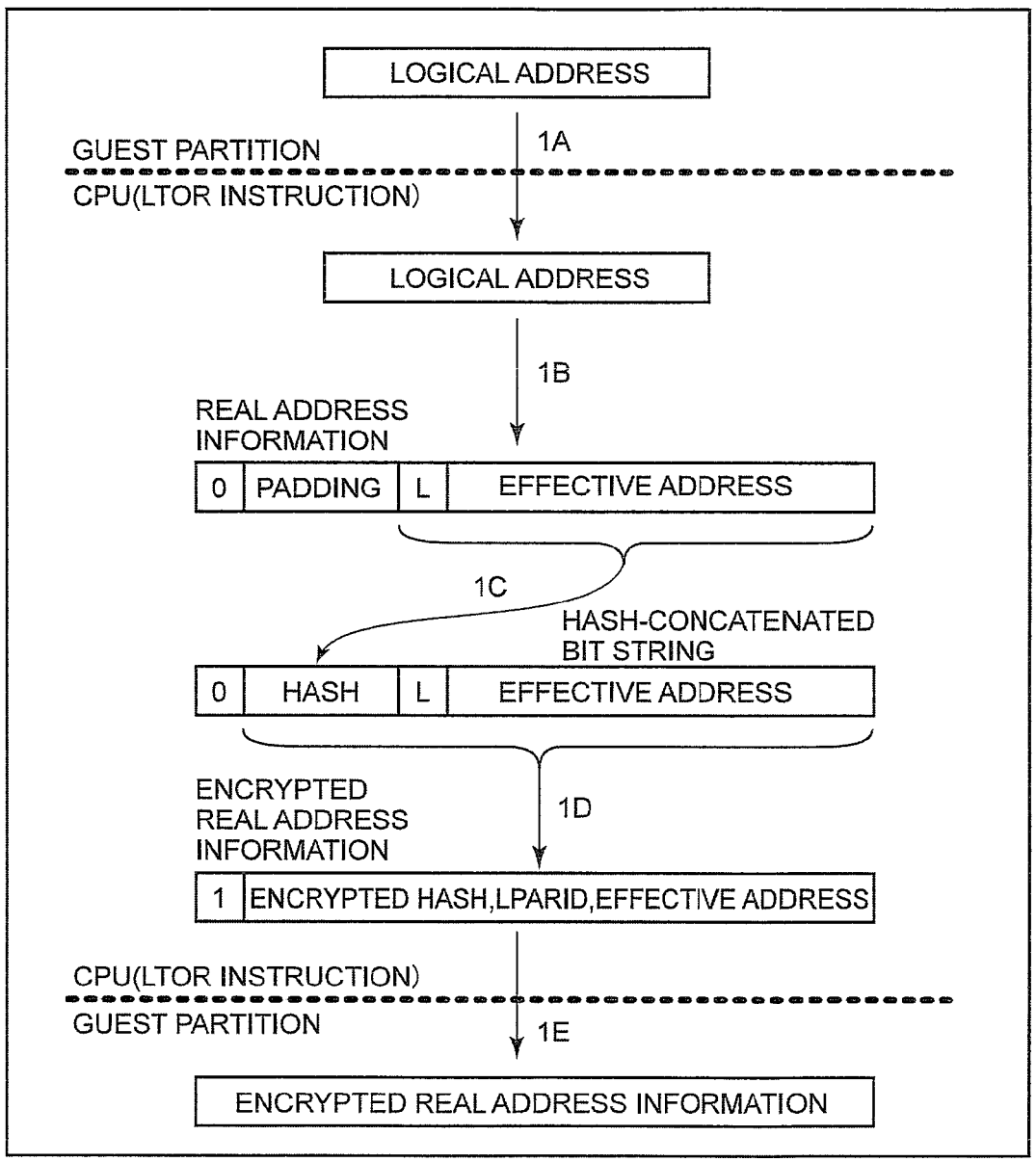
FIG. 3 illustrates the contents of processing in which a CPU converts a logical address to an encrypted real address information.

FIG. 3 illustrates a method for converting a logical address to an encrypted real address, in accordance with a preferred embodiment of the present invention. First, guest partition 192 executes the LTOR instruction, thus sending the logical address from guest partition 192 to CPU 10, as shown in step 1A.

In step 1B, CPU 10 converts the logical address to the real address information using an address conversion table. Preferably, the real address information includes an encryption bit, padding, LPARID, and an effective address of the real address. The encryption bit indicates whether the real address information is encrypted; a logical "1" indicates that the real address information is encrypted, and a logical "0" indicates that the real address information is not encrypted. As shown in step 1B, the real address information is not yet encrypted because the encryption bit is "0." LPARID is an identifier (ID) of guest partition 192, which is a logical partition (LPAR), and is denoted by "L" in FIG. 3.

In step 1C, CPU 10 applies a hash function (such as a secure hash algorithm 1 or SHA-1) to a bit string made of LPARID and the effective address, and embeds the result in the padding position. The result is a hash-concatenated bit string.

In step 1D, CPU 10 encrypts the hash-concatenated bit string according to the advanced encryption standard (AES) or the like, and then changes the encryption bit to "1." The result is the encrypted real address information, which the CPU 10 sends back to guest partition 192, as shown in step 1E.

Figure 4:
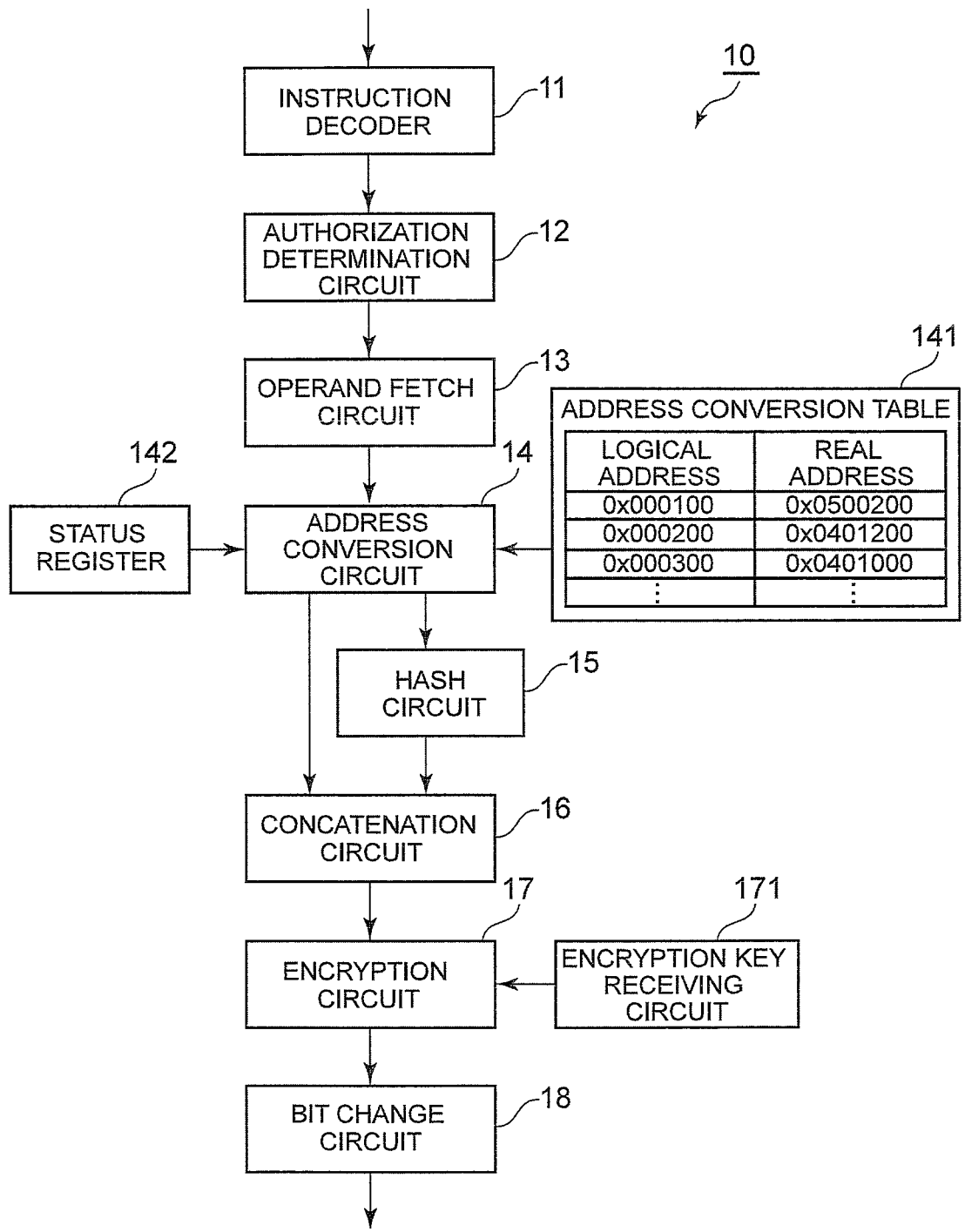
FIG. 4 is a block diagram illustrating the CPU functional units used to perform the conversion from a logical address to an encrypted real address information.

FIG. 4 illustrates the circuitry within CPU 10 needed to carry out the method depicted in FIG. 3. As shown, CPU 10 includes an instruction decoder 11, an authorization determination circuit 12, an operand fetch circuit 13, an address conversion circuit 14, an address conversion table 141, a status register 142, a hash circuit 15, a concatenation circuit 16, an encryption circuit 17, an encryption key receiving circuit 171, and a bit change circuit 18.

Figure 5:
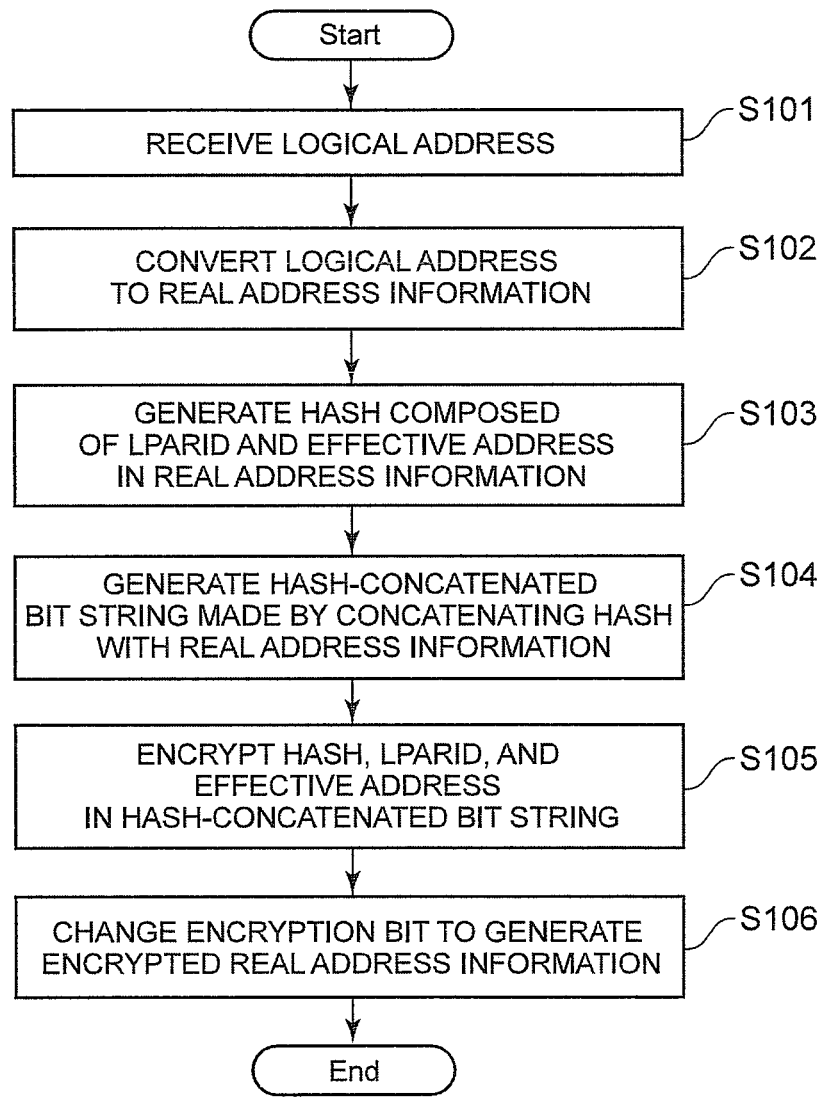
FIG. 5 is a flowchart illustrates a method for performing the conversion from a logical address to an encrypted real address information.

FIG. 5 is a flowchart illustrating the processing steps executed by the circuitry illustrated in FIG. 4. Both figures will be described together. To begin, instruction decoder 11 decodes an instruction executed by hypervisor 191 or guest partition 192.

Next, authorization determination circuit 12 determines whether or not the instruction decoded by instruction decoder 11 has been executed by software authorized to execute that instruction. Only guest partitions, such as guest partitions 192a-192c, may execute an LTOR instruction.

Next, operand fetch circuit 13 fetches an operand of the instruction decoded by instruction decoder 11, as shown in step 101 of FIG. 5. If the instruction is an LTOR instruction, operand fetch circuit 13 fetches a logical address as an operand.

In the case of an LTOR instruction, next address conversion circuit 14 converts the logical address just fetched to real address information, using address conversion table 141 and status register 142. Address conversion table 141 stores the conversion relationship between logical addresses and effective addresses of corresponding real addresses (referred to as "real address" in FIG. 4). Status register 142 stores LPARID of guest partition 192 that had executed the current instruction, as shown in step 102 of FIG. 5.

In step 103, hash circuit 15 generates the hash previously described in step 1C of FIG. 3, and in step 104, concatenation circuit 16 generates the resulting hash-concatenated bit string.

In step 105, encryption circuit 17 encrypts that hash-concatenated bit string, as previously described in step 1D of FIG. 3, using an encryption key provided by encryption key receiving circuit 171 from the encryption key storage area 50 (see FIG. 1). In step 106, bit change circuit 18 sets the encryption bit to "1" in the real address information just encrypted, completing step 1D of FIG. 3. The result is encrypted real address information, which is returned to one of guest partitions 192a-192c that had executed the LTOR instruction.

Once an operating system or application program running in guest partition 192 has the encrypted real address information returned by the LTOR instruction, it must be converted to a real address. This process is illustrated in FIG. 6.

Figure 6:
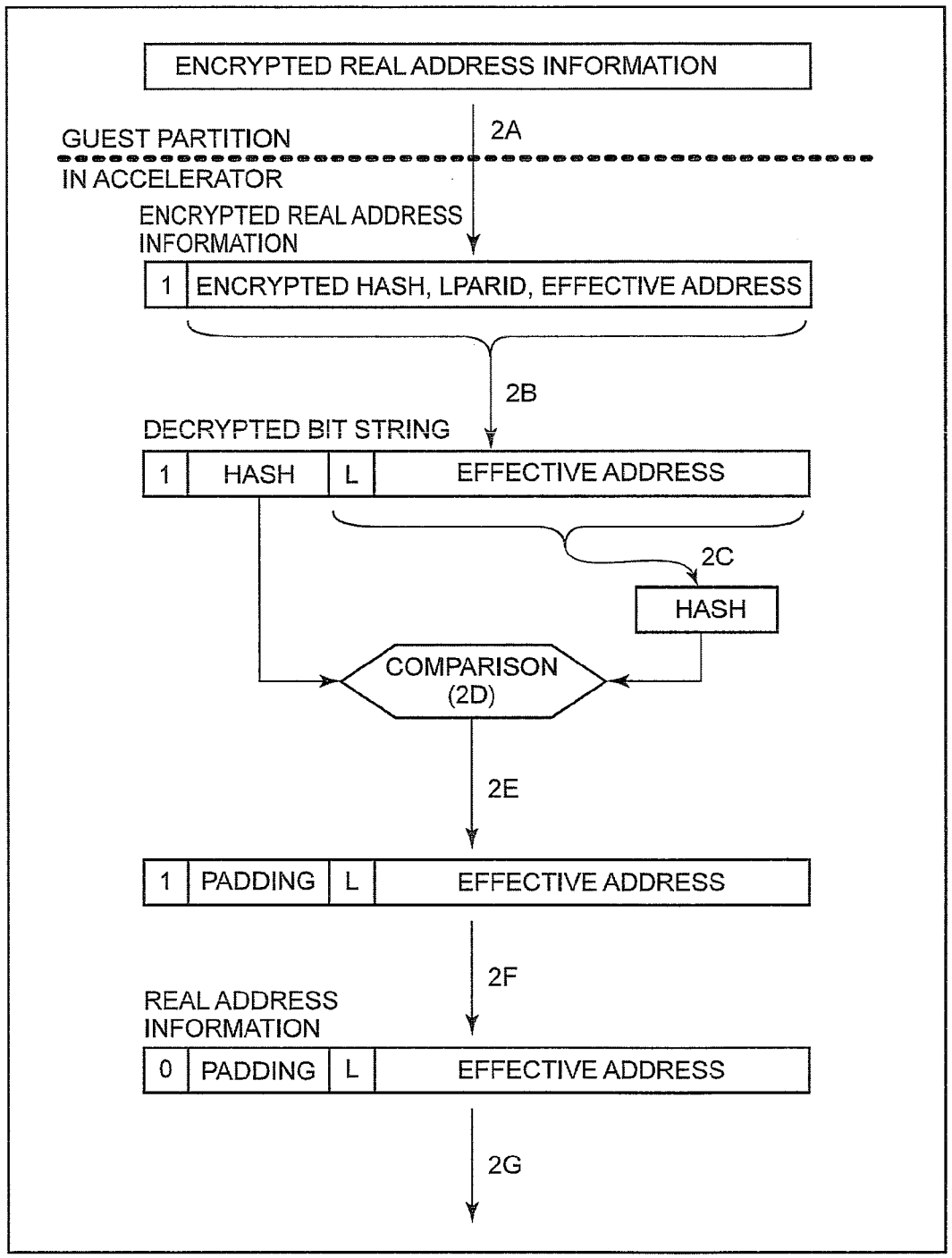
FIG. 6 is a diagram illustrating the contents of processing in which an accelerator converts the encrypted real address information to real address information.

To start the process, guest partition 192 generates an ICSWX instruction to be executed by accelerator 20, as shown in step 2A of FIG. 6. This instruction takes as arguments the LPARID of the guest partition and the encrypted real address information.

Next, in step 2B, accelerator 20 decrypts the encrypted real address information. Then, accelerator 20 applies a hash function to the bit string composed of the LPARID and the effective address in the decrypted bit string, as depicted in step 2C. As an error check, accelerator 20 compares the hash in the decrypted bit string with the hash just generated, as shown in step 2D. If the hashes match, processing proceeds; otherwise, an error is indicated. The LPARID in guest partition 192 that had executed the ICSWX instruction is compared with the LPARID in the decrypted bit string. If they match, processing proceeds; otherwise, an error is indicated.

If all is well, accelerator 20 replaces the hash in the decrypted bit string with zeros, as padding, as shown in step 2E. Then, accelerator 20 changes the encryption bit in the decrypted bit string to zero to generate real address information, as depicted in step 2F. Finally, accelerator 20 accesses memory device 30 using the real address information just generated, as shown in step 2G.

Figure 7:
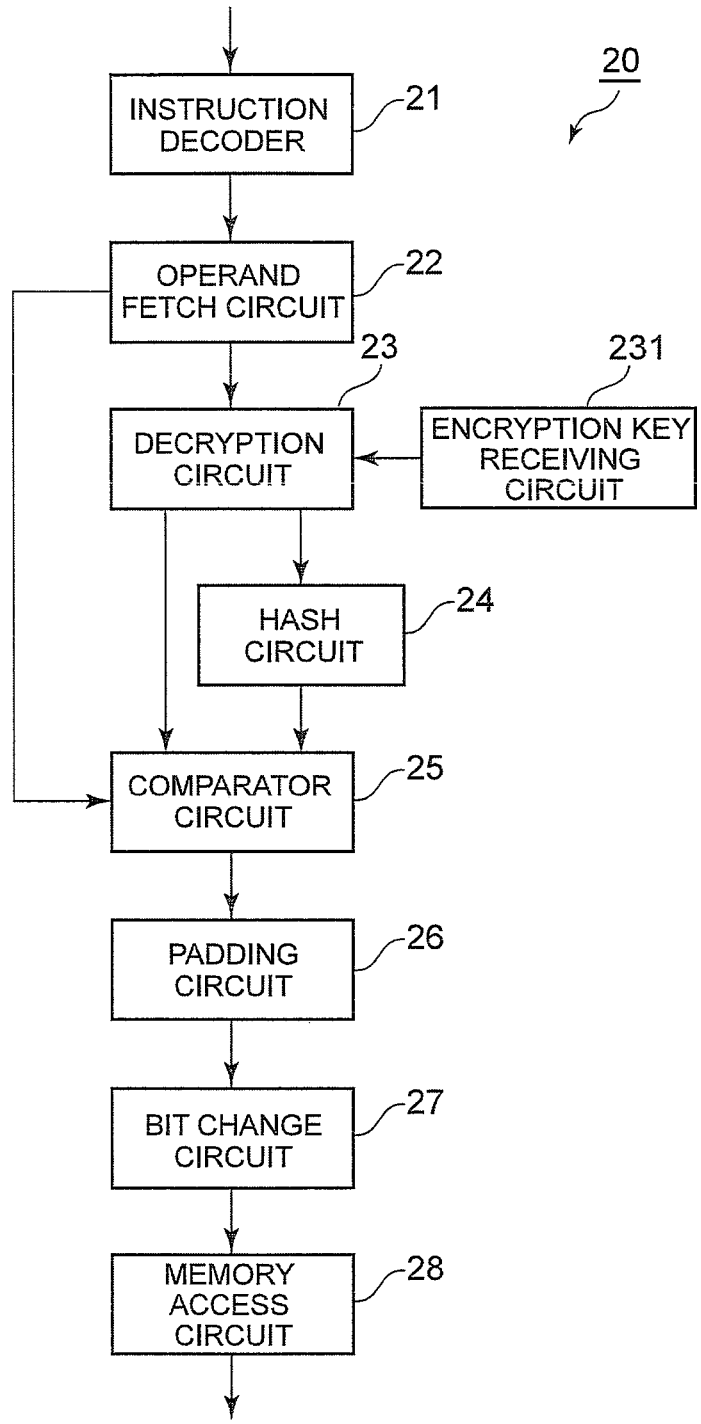
FIG. 7 is a block diagram illustrating the accelerator functional units used to perform the conversion from encrypted real address information to real address information.

FIG. 7 illustrates the circuitry within accelerator 20 needed to carry out the processing described above. As shown, accelerator 20 includes an instruction decoder 21, an operand fetch circuit 22, a decryption circuit 23, an encryption key receiving circuit 231, a hash circuit 24, a comparator circuit 25, a padding circuit 26, a bit change circuit 27, and a memory access circuit 28.

Figure 8:
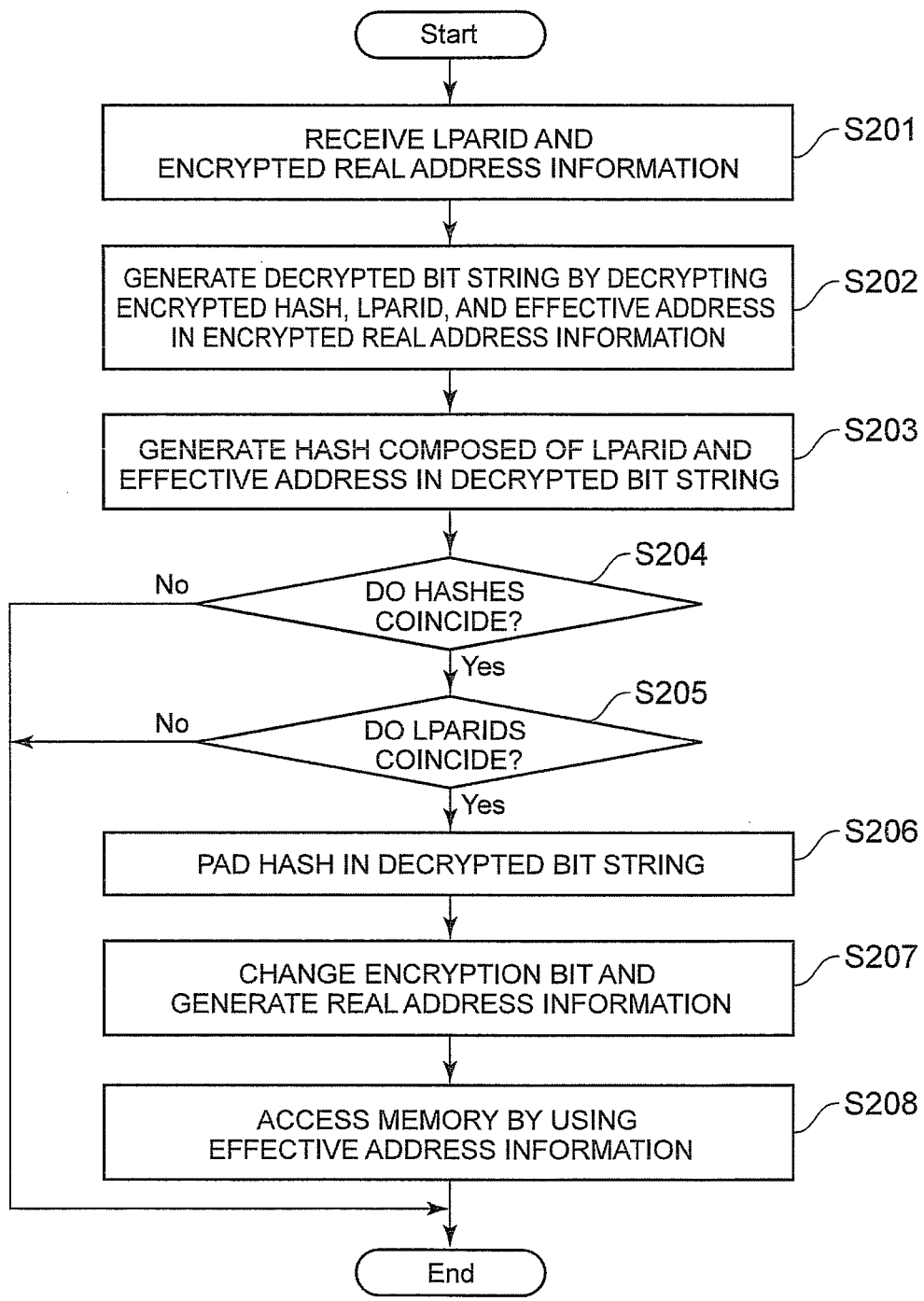
FIG. 8 is a flowchart illustrating a method for performing the conversion from encrypted real address information to real address information.

FIG. 8 is a flowchart illustrating the processing steps executed by accelerator 20 circuitry of FIG. 7. Both figures will be described together.

ICSWX instruction processing starts in instruction decoder 21, which receives and decodes an instruction sent from CPU 10. Then, operand fetch circuit 22 fetches the instruction's operands, i.e., encrypted real address information and LPARID, as shown in step 201 of FIG. 8.

Next, decryption circuit 23 decrypts the encrypted real address information to generate a decrypted bit string, using the encryption key provided by encryption key receiving circuit 231 from encryption key storage area 50 (from FIG. 1), as depicted in step 202. The decryption key may be the same or different from the encryption key originally used to encrypt the information.

Next, hash circuit 24 generates a hash composed of the LPARID and the effective address in the decrypted bit string, as shown in step 203. Then, comparator circuit 25 compares the hash in the decrypted bit string with the hash generated by hash circuit 24 in step 203, as depicted in step 204. If the hashes do not match, an error is indicated and processing is terminated. If the hashes match, comparator circuit 25 compares the LPARID in the decrypted bit string with the LPARID fetched by operand fetch circuit 22, as shown in step 205. If they match, processing proceeds; otherwise, an error is indicated.

If all is well, padding circuit 26 replaces hash section in the decrypted bit string with zeros, as depicted in step 206. Then, bit change circuit 27 changes the encryption bit in the decrypted bit string to "0," generating real address information, as shown in step 207. Finally, memory access circuit 28 accesses memory device 30 using the real address information just generated, as depicted in step 208.

By having CPU 10 to encrypt the real address, guest partition 192 is able to deal directly with that real address, which saves overhead by avoiding context switching. Also, by checking that the LPARID in the encrypted real address matches the LPARID of guest partition 192 that sent it, an invalid encrypted real address can be detected and avoided.

Although, in the present embodiment, a hash includes an LPARID and an effective address, it is not necessary. A hash having only the effective address may be used instead.

As has been described, the present disclosure provides a method and apparatus for performing mapping within a data processing system having multiple virtual machines.

Those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. A non-transitory computer readable device having a computer program product for performing mapping within a data processing system having a virtual machine controlled by a hypervisor, said computer readable device comprising:

program code for, in response to a demand to access a real memory address by a guest partition of said virtual machine having an associated logical address, sending said logical address by said guest partition to a central processing unit of said data processing system, wherein said central processing unit converts said logical address to encrypted real address information;

program code for sending said encrypted real address information from said central processing unit to said guest partition of said virtual machine, and for sending said encrypted real address information from said guest partition of said virtual machine to an accelerator without knowing a real address within said encrypted real address information;

program code for, in response to a receipt of said encrypted real address information from said guest partition of said virtual machine by said accelerator, decrypting said encrypted real address information by said accelerator into a set of real address information without using a hypervisor to perform mapping; and program code for accessing a memory device within said data processing system by said accelerator using a real address included within said set of real address information.

2. The computer readable device of claim 1, wherein said program code for converting said logical address to said encrypted real address information further includes
   program code for converting said logical address to a real address information; and
   program code for encrypting said real address information to form said encrypted real address information.

3. The computer readable device of claim 2, wherein said real address information includes an encryption bit, padding bits, an identifier for said guest partition and an effective address of an real address.

4. The computer readable device of claim 3, further including program code for filling said padding bits with a plurality of hash bit formed by applying a hash function to said identifier for said guest partition and said effective address of said real address.

5. The computer readable device of claim 1, wherein said program code for decrypting said encrypted real address information into a set of real address information further includes:

program code for decrypting said encrypted real address information into a decrypted bit string having said hash bits, said identifier for said guest partition and an effective address;

program code for generating a second hash by said accelerator using said identifier for said guest partition and said effective address; program code for determining whether or not said second hash matches said hash bits;

program code for, in a determination that said second hash matches said hash bits, generating said set of real address information by replacing said hash bits with zeros; and program code for, in a determination that said second hash does not match said hash bits, generating an error message.

* * * * *